(12) United States Patent
Porat et al.

(10) Patent No.: US 8,320,492 B2
(45) Date of Patent: Nov. 27, 2012

(54) CLOSED FORM SINGULAR VALUE DECOMPOSITION

(75) Inventors: Ron Porat, San Diego, CA (US); Yi Jiang, San Diego, CA (US)

(73) Assignee: Wi-LAN Inc., Ottawa (CA)

( * ) Notice: Subject to any disclaimer, the term of this patent is extended or adjusted under 35 U.S.C. 154(b) by 0 days.

(21) Appl. No.: 12/986,635

(22) Filed: Jan. 7, 2011

(65) Prior Publication Data

US 2011/0164700 A1    Jul. 7, 2011

Related U.S. Application Data

(63) Continuation of application No. PCT/US2009/049851, filed on Jul. 7, 2009, which is a continuation of application No. PCT/US2009/049852, filed on Jul. 7, 2009, which is a continuation of application No. PCT/US2009/049853, filed on Jul. 7, 2009.

(60) Provisional application No. 61/078,766, filed on Jul. 7, 2008, provisional application No. 61/078,765, filed on Jul. 7, 2008, provisional application No. 61/078,767, filed on Jul. 7, 2008.

(51) Int. Cl.
*H04B 7/02* (2006.01)

(52) U.S. Cl. ........ 375/267; 375/259; 375/260; 375/295; 375/316; 375/299; 375/346; 375/347; 375/349

(58) Field of Classification Search .................. 375/259, 375/260, 267, 295, 316, 299, 346, 347, 349
See application file for complete search history.

(56) References Cited

U.S. PATENT DOCUMENTS

| 7,450,532 | B2 | 11/2008 | Chae et al. |
| 7,711,066 | B2* | 5/2010 | Jiang et al. ..................... 375/296 |
| 8,130,847 | B2* | 3/2012 | Vook et al. ..................... 375/260 |
| 2002/0147953 | A1* | 10/2002 | Catreux et al. ................ 714/746 |
| 2005/0249151 | A1 | 11/2005 | Takano |
| 2006/0083195 | A1* | 4/2006 | Forenza et al. ............... 370/328 |
| 2008/0049709 | A1 | 2/2008 | Pan et al. |

FOREIGN PATENT DOCUMENTS

WO    2006/138032    12/2006

OTHER PUBLICATIONS

Golub et al., "Matrix Computations," Johns Hopkins University Press, Third Edition (1996).

(Continued)

*Primary Examiner* — Siu Lee
(74) *Attorney, Agent, or Firm* — Volpe and Koenig, P.C.

(57) ABSTRACT

The subject matter disclosed herein provides methods and apparatus for determining a singular value decomposition, providing feedback from a client station to a base station, and closed loop operation of a wireless system implementing multiple-input multiple-output (MIMO). The method may include determining one or more singular vectors using a closed form singular value decomposition. The one or more determined singular vectors may be provided to a precoder at the base station as feedback. The method may include aligning a phase of one or more singular vectors. The method may also include determining, at a client station, a plurality of singular vectors for channels used in a MIMO transmission from a base station to a client station. The client station may provide an indication to the base station regarding whether to use a singular value decomposition or a uniform channel decomposition. Related systems, apparatus, methods, and/or articles are also described.

8 Claims, 7 Drawing Sheets

OTHER PUBLICATIONS

IEEE Standard for Local and metropolitan area networks; Part 16: Air Interface for Fixed Broadband Wireless Access Systems, IEEE Std. 802.16-2004 (Oct. 1, 2004).

IEEE Standard for Local and metropolitan area networks; Part 16: Air Interface for Fixed Broadband Wireless Access Systems; Amendment 2: Physical and Medium Access Control Layers for Combined Fixed and Mobile Operation in Licensed Bands and Corrigendum 1, IEEE Std 802.16e-2005 and IEEE Std 802.16-2005/Cor1-2005 (Feb. 2006).

* cited by examiner

CLOSED FORM SINGULAR VALUE DECOMPOSITION

CROSS REFERENCE TO RELATED APPLICATIONS

This application is a continuation of PCT Application No. PCT/US2009/049851 filed Jul. 7, 2009, which claims the benefit of U.S. Patent Application Ser. No. 61/078,766 filed Jul. 7, 2008. This application is also a continuation of PCT Application No. PCT/US2009/049852 filed Jul. 7, 2009, which claims the benefit of U.S. Patent Application Ser. No. 61/078,765 filed Jul. 7, 2008. This application is also a continuation of PCT Application No. PCT/US2009/049853 filed Jul. 7, 2009, which claims the benefit of U.S. Patent Application Ser. No. 61/078,767 filed Jul. 7, 2008. All of the above referenced applications are hereby incorporated by reference herein.

TECHNICAL FIELD

The subject matter described herein relates to wireless communications.

BACKGROUND

In signal processing associated with wireless devices, the singular value decomposition is frequently used to process signals. The singular value decomposition is a factorization of a rectangular real or a complex matrix. For example, the singular value decomposition is a decomposition that may include determining a pseudoinverse, a least squares fitting of data, a matrix approximation, and determining the rank, the range and/or the null space of a matrix. As such, the singular value decomposition is a computationally intensive operation, which in the case of a wireless device, may be problematic. Moreover, in many implementations, the singular value decomposition is an iterative solution, not of a closed form.

Multiple-input and multiple-output (MIMO) is typically used in wireless communications to enhance performance, when compared to non-MIMO approaches. For example, multiple antennas may be implemented at the transmitter and/or the receiver to improve performance by providing, in some implementations, enhanced throughput and range. Often, these performance enhancements may be obtained without substantial increases in transmitted power and/or bandwidth, hence the appeal of MIMO. However, MIMO typically comes at the cost of complex processing, including complex singular value decomposition processing, at the transmitter and at the receiver

SUMMARY

The subject matter disclosed herein provides methods and apparatus for determining a singular value decomposition; providing feedback from a client station to a base station; and closed loop operation of a wireless system implementing multiple input multiple output (MIMO).

A method may include receiving a plurality of signals transmitted at a base station implementing a plurality of antennas configured for a multiple-input and multiple-output transmission. Moreover, one or more singular vectors may be determined using a closed form singular value decomposition. The one or more determined singular vectors may be provided to a precoder at the base station as feedback.

A method may include receiving, at a base station, a singular vector determined, at a client station, using a closed form singular value decomposition. The received singular vector may be used when precoding a plurality of signals for transmission using a multiple-input and multiple-output transmission. Moreover, the precoded plurality of signals may be transmitted as the multiple-input and multiple-output transmission.

A method may align a phase of one or more singular vectors. The singular vectors may each represent one of a plurality of subcarriers of a band. Moreover, an average singular vector may be determined for the plurality of subcarriers of the band, the aligned average singular vector representative of the plurality of subcarriers of the band. The aligned average singular vector may be provided, as feedback, to a precoder at a base station.

A method may include receiving, at a base station, an aligned average singular vector. Moreover, the received aligned average singular vector may be used when precoding a plurality of signals for transmission using a multiple-input and multiple-output transmission. Furthermore, the precoded plurality of signals may be transmitted as the multiple-input and multiple-output transmission.

A method may include determining, at a client station, a plurality of singular vectors for channels used in a multiple-input multiple-output (MIMO) transmission from a base station to a client station. Moreover, the client station may provide a first indication to the base station to use a singular value decomposition, when one of the singular vectors is substantially larger (e.g., stronger) than the other singular vector. Furthermore, the client station may provide a second indication to the base station to use a uniform channel decomposition, when one of the singular vectors is not substantially larger than the other singular vector.

A method may include receiving, at a base station from a client station, a first indication to use a singular value decomposition, if one of the singular vectors is substantially larger than the other singular vector. Moreover, the base station may receive from the client station, a second indication to use a uniform channel decomposition, when one of the singular vectors is not substantially larger than the other singular vector. Furthermore, the base station may be configured for transmission based on at least one of the first indication or the second indication received from the client station.

The details of one or more variations of the subject matter described herein are set forth in the accompanying drawings and the description below. Features and advantages of the subject matter described herein will be apparent from the description and drawings, and from the claims.

BRIEF DESCRIPTION OF THE DRAWINGS

A more detailed understanding may be had from the following description, given by way of example in conjunction with the accompanying drawings wherein.

DETAILED DESCRIPTION

Figure 1:
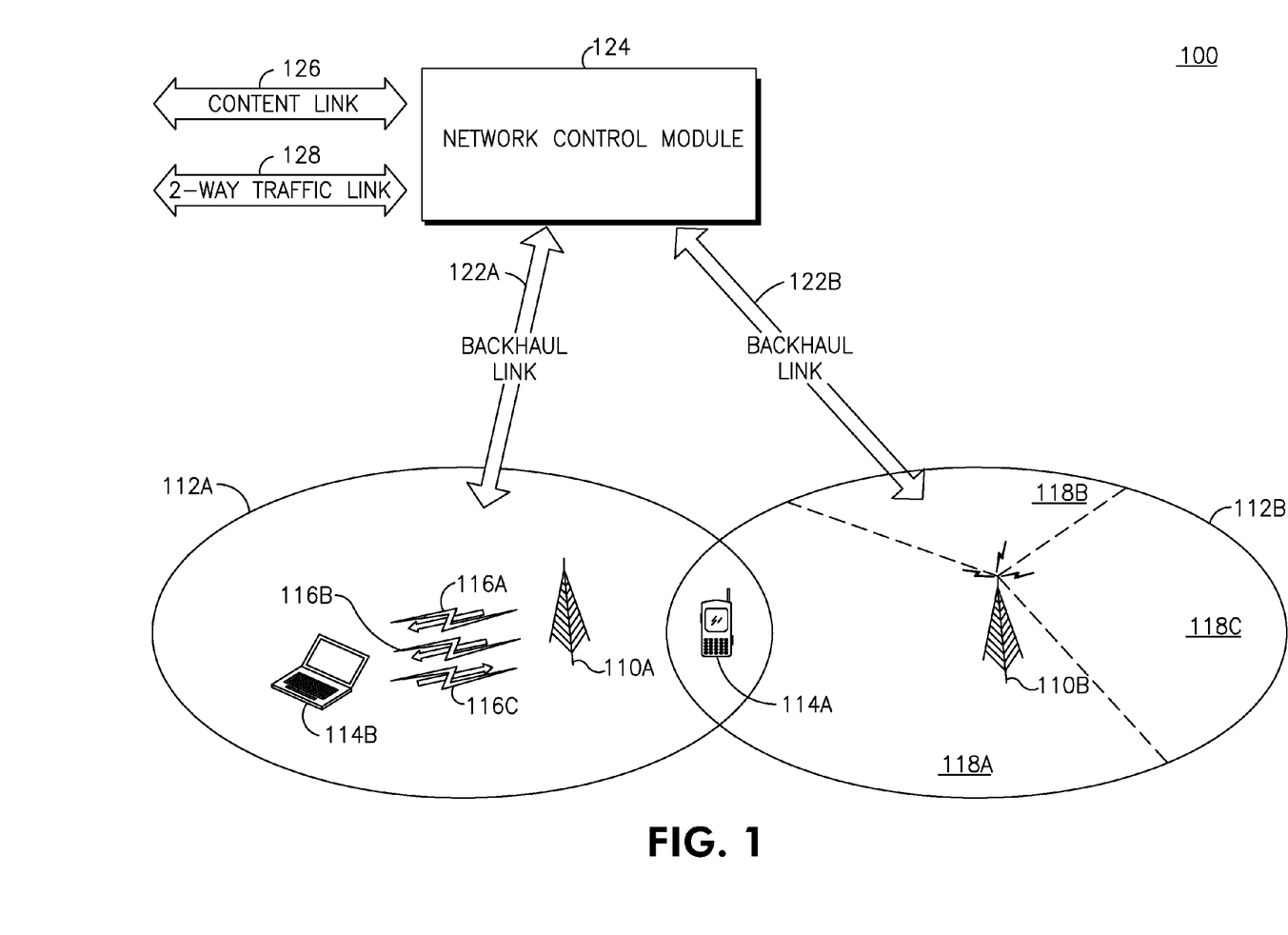
FIG. 1 depicts a block diagram of a network including client stations and base stations.

FIG. 1 is a simplified functional block diagram of an embodiment of a wireless communication system 100. The wireless communication system 100 includes a plurality of base stations 110A and 110B, each supporting a corresponding service or coverage area 112A and 112B. The base stations are capable of communicating with wireless devices within their coverage areas. For example, the first base station 110A is capable of wirelessly communicating with a first client station 114A and a second client station 114B within the coverage area 112A. The first client station 114A is also within the coverage area 112B and is capable of communicating with the second base station 110B. In this description, the communication path from the base station to the client station is referred to as a downlink 116A-B and the communication path from the client station to the base station is referred to as an uplink 116C.

Although, for simplicity, only two base stations are shown in FIG. 1, a typical wireless communication system 100 may include a larger number of base stations. The base stations 110A and 110B can be configured as cellular base station transceiver subsystems, gateways, access points, radio frequency (RF) repeaters, frame repeaters, nodes, or any wireless network entry point.

The base stations 110A and 110B can be configured to support an omni-directional coverage area or a sectored coverage area. For example, the second base station 110B is depicted as supporting the sectored coverage area 112B. The coverage area 112B is depicted as having three sectors, 118A, 118B, and 118C. In typical embodiments, the second base station 110B treats each sector 118 as effectively a distinct coverage area.

Although only two client stations 114A and 114B are shown in the wireless communication system 100, typical systems are configured to support a large number of client stations. The client stations 114A and 114B can be mobile, nomadic, or stationary units. The client stations 114A and 114B are often referred to as, for example, mobile stations, mobile units, subscriber stations, wireless terminals, or the like. A client station can be, for example, a wireless handheld device, a vehicle mounted device, a portable device, client premise equipment, a fixed location device, a wireless plug-in accessory or the like. In some cases, a client station can take the form of a handheld computer, notebook computer, wireless telephone, personal digital assistant, wireless email device, personal media player, meter reading equipment or the like and may include a display mechanism, microphone, speaker and memory.

In a typical system, the base stations 110A and 110B also communicate with each other and a network control module 124 over backhaul links 122A and 122B. The backhaul links 122A and 122B may include wired and wireless communication links. The network control module 124 provides network administration and coordination as well as other overhead, coupling, and supervisory functions for the wireless communication system 100.

In some embodiments, the wireless communication system 100 can be configured to support both bidirectional communication and unidirectional communication. In a bidirectional network, the client station is capable of both receiving information from and providing information to the wireless communications network. Applications operating over the bidirectional communications channel include traditional voice and data applications. In a unidirectional network, the client station is capable of receiving information from the wireless communications network, but may have limited or no ability to provide information to the network. Applications operating over the unidirectional communications channel include broadcast and multicast applications. In one embodiment, the wireless system 100 supports both bidirectional and unidirectional communications. In such an embodiment, the network control module 124 is also coupled to external entities via, for example, content link 126 (e.g., a source of digital video and/or multimedia) and two-way traffic link 128.

The wireless communication system 100 can be configured to use Orthogonal Frequency Division Multiple Access (OFDMA) communication techniques. For example, the wireless communication system 100 can be configured to substantially comply with a standard system specification, such as IEEE 802.16 and its progeny or some other wireless standard such as, for example, WiBro, WiFi, Long Term Evolution (LTE), or it may be a proprietary system. The subject matter described herein is not limited to application to OFDMA systems or to the noted standards and specifications. The description in the context of an OFDMA system is offered for the purposes of providing a particular example only.

As used herein, IEEE 802.16 refers to one or more Institute of Electrical and Electronic Engineers (IEEE) Standard for Local and metropolitan area networks, Part 16: Air Interface for Fixed Broadband Wireless Access Systems, 1 Oct. 2004, IEEE Standard for Local and metropolitan area networks, Part 16: Air Interface for Fixed and Mobile Broadband Wireless Access Systems, 26 Feb. 2006, and any subsequent additions or revisions to the IEEE 802.16 series of standards.

In some embodiments, downlinks 116A-B and uplink 116C each represent a radio frequency (RF) signal. The RF signal may include data, such as voice, video, images, Internet Protocol (IP) packets, control information, and any other type of information. When IEEE-802.16 is used, the RF signal may use OFDMA. OFDMA is a multi-user version of orthogonal frequency division multiplexing (OFDM). In OFDMA, multiple access is achieved by assigning to individual users groups of subcarriers (also referred to as subchannels or tones). The subcarriers are modulated using BPSK (binary phase shift keying), QPSK (quadrature phase shift keying), QAM (quadrature amplitude modulation), and carry symbols (also referred to as OFDMA symbols) including data coded using a forward error-correction code.

In some embodiments, a base station is implemented using multiple-input and multiple-output (MIMO). When MIMO is used, a base station may include a plurality of antennas. For example, base station 110A may be configured for MIMO and include a precoder (described further below) coupled to two antennas for transmitting the MIMO transmission via downlinks 116A-B. A client station may include a plurality of antennas to receive the MIMO transmission sent via downlinks 116A-B. The precoder is configured to perform "precoding," which refers to beamforming to support MIMO transmission at each of the antennas (e.g., using singular vectors to weight orthogonal "eigen-beams" transmitted via each of the antennas). The client station may also combine the received signals, which may result in fewer errors and/or enhanced data transfer. Although the examples given herein are made in the context of MIMO, other smart antenna techniques may be used as well including MISO (multiple input, single output) and SIMO (single input, multiple output).

Moreover, when MIMO is used, the base station may perform precoding (which may use additional information, such as, for example, channel estimation information) to code, for each antenna, one or more streams of symbols for transmission over the corresponding antenna. In a closed loop feedback-based approach, the channel estimation information may be provided by the client station to the base station. For example, a client station may receive each of the downlinks 116A-B transmitted by the antennas of the base station, decode the received downlink signals, determine channel estimation information for the decoded channels (e.g., subcarriers) in each of the received downlink signals, and then provide to the base station the determined channel estimation information. The channel estimation information provided by the client station may include singular vectors determined by the client station using a singular value decomposition (SVD). Although the channel estimation information is described as including singular vectors, the channel estimation information may also include other channel information, such as the signal-to-noise ratio of a subcarrier, carrier-to-noise ratio, a channel covariance matrix, a channel matrix, and the like.

To determine the singular vectors, the client station may perform a singular value decomposition (SVD). The client station may provide, as feedback, the singular vectors determined using the singular value decomposition. The singular vectors may be determined in a variety of ways. A channel estimator at the client station may determine the singular vectors $v_1$ and $v_2$ (also referred to as $u_1$ and $u_2$), as described below. Although the following describes determining singular vectors $V_1$ and $v_2$ for the case of an N×2 matrix (i.e., when the client station has 2 antennas), the closed form may be extended to client stations with other quantities of antennas. Further, a typical singular value decomposition is an iterative calculation, which may be computationally intensive for a client station. As such, some or all of the subject matter described herein may relate to a closed form singular value decomposition, which may be less computationally intensive when compared to typical, iterative singular value decomposition algorithms.

Alternatively or additionally, the singular vectors may be determined for each of the channels (e.g., subcarriers) used by the antennas transmitting from the base station to the client station. For example, the base station may include two antennas, each of which transmits over a channel comprising one or more subcarriers. The client station may then determine singular vectors for the subcarriers. Moreover, the subcarriers (as well as other channel information) may be used to determine the so-called "strength" of the channel. For example, in the two antenna case, if the singular vector $V_1$ is substantially larger (e.g., when the eigen-subchannel of Vi is much larger than eigen-subchannel of $V_2$) than the singular vector $V_2$, then the client station may provide an indication to the base station to use a singular value decomposition at the precoder. However, if the singular vector $V_1$ is not substantially larger than the singular vector $v_2$, then the client station may provide an indication to the base station to use uniform channel decomposition when precoding at the base station. In some implementations, configuring the base station for a single stream of symbols using a singular value decomposition or a plurality of streams of symbols using a uniform channel decomposition (e.g., based on feedback from the client station indicating the "strength" of the singular vectors) provides enhanced performance, compared to operation using only a singular value decomposition or only a uniform channel decomposition.

Figure 2:
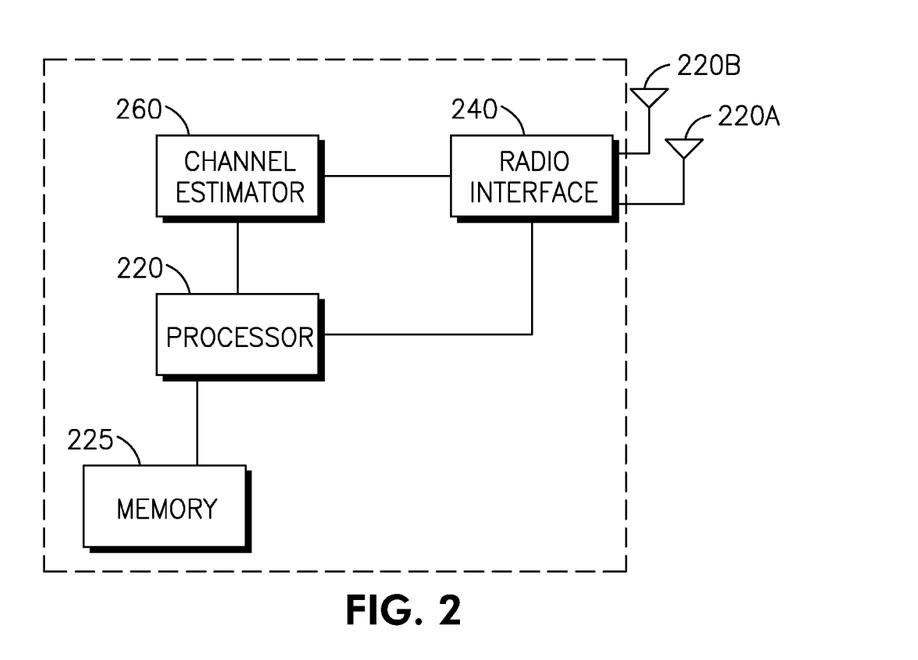
FIG. 2 depicts a block diagram of a client station.

FIG. 2 depicts an exemplary client station, such as, for example, client station 114B. The client station 114B may include a plurality of antennas 220A-B for receiving the downlinks 116A-B, each transmitted by a base station, such as base station 110A, which may implement MIMO as described further below. Although the examples described herein refer to two antennas at the base station and two antennas at the client station, other quantities of antennas may be used at the base station and the client station. The client station 114B also includes a radio interface 240, which may include other components, such as filters, converters (e.g., digital-to-analog converters and the like), symbol demappers, an Inverse Fast Fourier Transform (IFFT) module, and the like, to process the received MIMO transmission sent via downlinks 116A-B, to determine channel estimation information, and to decode any data, such as the symbols, carried by the downlinks. In some implementations, the client station 114B is also compatible with IEEE 802.16, OFDMA, and MIMO transmissions (which may be sent via downlinks 116A-B). MIMO implementations using other wireless technologies, such as LTE, WiBro, and the like, may also be implemented using the subject matter described herein. The client station 114B may further include a channel estimator 260 (described further below), a processor 220 for controlling client station 114B and for accessing and executing program code stored in memory 225.

For each of the MIMO transmissions sent via downlinks 116A-B and received at each of antennas 220A-B, the channel estimator 260 may determine channel estimation information, such as singular vectors determined using a singular value decomposition. For example, for each of the subcarriers of a band, the channel estimator 260 may determine singular vectors using a singular value decomposition. In some embodiments, rather than or in addition to performing a traditional, iterative singular value decomposition to determine the singular vectors, the channel estimator 260 may perform a closed form singular value decomposition. The closed form singular value decomposition may be used to determine singular vectors $v_1$ and $v_2$. For each of the subcarriers, channel estimator 260 may determine one or more of the singular vectors $v_1$ and $v_2$. Moreover, the channel estimator 260 may then provide, based on the strength of the determined singular vectors, an indication to the precoder at the base station to use a singular value decomposition or to use a uniform channel decomposition. When a singular value decomposition is used, the precoder at the base station provides, based on a singular value decomposition, a single stream of symbols for MIMO transmission. When uniform channel decomposition is used, the precoder at the base station provides, based on a uniform channel decomposition, a plurality of streams of symbols for MIMO transmission. The determined singular vectors (as well as any other channel estimation information) may then be provided as feedback by the client station to a precoder at the base station (e.g., as a management message transmitted via uplink 116C), which may be used at the precoder to configure for a singular value decomposition or a uniform channel decomposition.

In some embodiments, channel estimator 260 may determine the singular vector $v_i$ based on the following:

$$v_1 = h_1^* \cos\theta + h_2^* \sin\theta e^{j\phi},$$

and may determine the singular vector $v_2$ based on the following:

$$v_2 = h_1^* \sin\theta + h_2^* \cos\theta e^{j\phi}.$$

The determined singular vectors $v_1$ and $v_2$ may then be provided as feedback to the base station (e.g., as a management message transmitted via uplink 116C).

The following provides example implementations for determining the singular vectors $v_1$ and $v_2$, although other approaches may be used as well. Generally, analog feedback may provide advantages, such as low complexity at the client station (e.g., a mobile station) and unbounded feedback accuracy which may be particularly important for multi-user MIMO with uncorrelated antennas or multi-base station MIMO.

There are several options for feedback, such as using a full channel matrix H, a covariance matrix $H^H H$, a strongest (e.g., largest) right singular vector, and two strongest right singular vectors. While feeding back the full channel matrix or channel covariance provides sufficient information for single user and/or multi-user MIMO, feeding back just the first or two strongest eigenvectors may reduce feedback overhead.

For example, a 4 antenna base station requires 8 complex values for feedback consisting of a full channel matrix or a covariance matrix, and only 3 complex values for the strongest right singular vector option and 5 complex values for the two strongest right singular vectors option. An 8 antenna base station or two 4 antenna base stations in multi-base station MIMO will require 16, 7, and 13 values for the full channel matrix option, the strongest right singular vector option and the two strongest right singular vectors option, respectively. In addition, a typical operation of closed loop MIMO in frequency division duplex may require the client station (e.g., a mobile station) to send an initial estimate of the post precoding carrier-to-interference-plus-noise ratio (CINR).

To further illustrate, the following provides an example of how the singular values of the channel may be calculated, as these will determine the post precoding signal-to-noise ratio (SNR).

Assume the channel matrix H is of dimension 2 by N (2×N), where N is greater than or equal to 2 (N>=2). The singular values can be found from the eigenvalues of $HH^H$, which is a 2×2 dimension matrix and which may be solved based on the following two equations:

$$\sigma_1^2 + \sigma_2^2 = Tr(HH^H)$$

$$\sigma_1^2 \sigma_2^2 = det(HH^H),$$

where Tr is trace and $\sigma_1$ and $\sigma_2$ are the two singular values of H.

To calculate the singular value decomposition, the focus is on the matrix $H^H$, which may be of size N×2. Then, the correct singular vectors that are of size 2 may be found and those singular vectors may be used to find the left singular vectors that are the right singular vectors of H.

First, the form of $H^H$ may be of the following form: $H^H = V\Sigma U^H$, where U may be generally expressed as follows:

$$U = \begin{pmatrix} \cos\theta & \sin\theta \\ \sin\theta e^{j\phi} & -\cos\theta e^{j\phi} \end{pmatrix}.$$

By the definition of the singular value decomposition, the first column of matrix U may be calculated according to the following equation:

$$\theta, \phi = \operatorname*{argmax}_{\theta,\phi} \left\| H^H \begin{pmatrix} \cos\theta \\ \sin\theta e^{j\phi} \end{pmatrix} \right\|,$$

where $\|x\|$ represents a Euclidean norm. The maximum Euclidean norm is the maximal singular value $\sigma_1$.

Denoting the $i^{th}$ row of matrix H as $h_i$ and developing the above expression, the following equation is formed:

$$e^{j\phi} = \frac{h_2^* h_1}{|h_2^* h_1|},$$

which may be expressed (e.g., via substitution) as follows:

$$\theta = \operatorname*{argmax}_{\theta} |h_1|^2 \cos^2\theta + |h_2|^2 \sin^2\theta + 2|h_2^* h_1| \sin\theta\cos\theta.$$

Differentiating and equating to zero, the following equation is formed:

$$\tan 2\theta = \frac{2|h_2^* h_1|}{|h_1|^2 - |h_2|^2},$$

after which a CORDIC rotation is used to calculate $\cos\theta$ and $\sin\theta$. Using $UH^H = V\Sigma$, the strongest singular vector may be determined by normalizing the following equation:

$$v_1 = h_1^* \cos\theta + h_2^* \sin\theta e^{j\phi}.$$

At this point, the strongest right singular vector may be finalized. To finalize the two right strongest singular vectors, a solution to the following equation may be found:

$$v_2 = h_1^* \sin\theta + h_2^* \cos\theta e^{j\phi}, \text{ which may be normalized.}$$

To illustrate further, the singular value decomposition (SVD) is generally done through iterative procedures. But for the special case of an N×2 matrix, the decomposition may be done via a closed form solution for singular value decomposition. For example, given a matrix of the following form:

$H = [h_1 \vdots h_2] \in C^{N\times 2}$, and then calculating the singular value decomposition as follows:

$$H = U\Sigma V^*,$$

where $U = [u_1 \vdots u_2] \in C^{N \times 2}$ is a orthonormal matrix, and $\Sigma$ is of the following form:

$$\Sigma = \begin{pmatrix} \sigma_1 & 0 \\ 0 & \sigma_2 \end{pmatrix},$$

and V is of the following form:

$$V = \begin{pmatrix} \cos\theta & \sin\theta \\ \sin\theta e^{j\phi} & -\cos\theta e^{j\phi} \end{pmatrix}.$$

By the definition of the singular value decomposition, the first column of V, which is parameterized by $\theta$ and $\phi$, is calculated according to the following equation:

$$\theta, \phi = \underset{\theta, \phi}{\operatorname{argmax}} \left\| H \begin{pmatrix} \cos\theta \\ \sin\theta e^{j\phi} \end{pmatrix} \right\|,$$

where $\|x\|$ represents the Euclidean norm and this maximum Euclidean norm is the maximal singular value $\sigma_1$. Denoting $a_i$, $b_i$ as the ith element of $h_1$ and $h_2$, respectively, the solution of the $\theta$ and $\phi$ equation above may be derived based on the following equation:

$$\theta, \phi = \underset{\theta, \phi}{\operatorname{argmax}} \sum_{i=1}^{N} |a_i \cos\theta + b_i \sin\theta e^{j\phi}|^2$$

$$= \underset{\theta, \phi}{\operatorname{argmax}} \sum_{i=1}^{N} |a_i|^2 \cos^2\theta + \sum_{i=1}^{N} |b_i|^2 \sin^2\theta +$$

$$2\operatorname{Re}\left\{\sum_{i=1}^{N} a_i b_i^* \sin\theta \cos\theta e^{-j\phi}\right\}.$$

Thus, the optimal $\phi = \angle(\Sigma_{i=1}^{N} a_i b_i^*)$, which may be expressed as follows:

$$e^{j\phi} = \frac{\sum_{i=1}^{N} a_i b_i^*}{\left|\sum_{i=1}^{N} a_i b_i^*\right|}.$$

Further simplification of the $\theta$ and $\phi$ equation yields the following:

$$\theta = \underset{\theta}{\operatorname{argmax}} \sum_{i=1}^{N} |a_i|^2 \cos^2\theta + \sum_{i=1}^{N} |b_i|^2 \sin^2\theta + 2 \left|\sum_{i=1}^{N} a_i b_i^*\right| \sin\theta \cos\theta,$$

and further constraining $$\theta \in \left[0, \frac{\pi}{2}\right)$$

causes no loss of optimality, and equating the derivative to zero yields the following:

$$\left(\sum_{i=1}^{N} |b_i|^2 - \sum_{i=1}^{N} |a_i|^2\right) \sin 2\theta + 2\left|\sum_{i=1}^{N} a_i b_i^*\right| \cos 2\theta = 0.$$

Hence, the following:

$$\tan 2\theta = \frac{2\left|\sum_{i=1}^{N} a_i b_i^*\right|}{\sum_{i=1}^{N} |a_i|^2 - \sum_{i=1}^{N} |b_i|^2}.$$

The value of $\theta$ may be calculated based on the above equation, which may have only one solution in the interval 0 to $\pi/2$. However, since the solution of interest is $\cos\theta$ and $\sin\theta$ rather than $\theta$ itself, the following may be used to find a solution:

$$\tan 2\theta = \frac{2\tan\theta}{1 - \tan^2\theta}.$$

When $\alpha$ is denoted as follows:

$$\alpha = \frac{\sum_{i=1}^{N} |a_i|^2 - \sum_{i=1}^{N} |b_i|^2}{2\left|\sum_{i=1}^{N} a_i b_i^*\right|}.$$

The following equation results:

$$\frac{1 - \tan^2\theta}{2\tan\theta} = \alpha,$$

which may lead to the unique solution in $\theta$ over the interval of 0 to $\pi/2$ $$\left(\theta \in \left[0, \frac{\pi}{2}\right)\right),$$

as follows:

$$\tan\theta = \sqrt{1 + \alpha^2} - \alpha;$$

$$\cos\theta = \frac{1}{\sqrt{1 + \tan^2\theta}};$$

and $$\sin\theta = \cos\theta * \tan\theta.$$

Given the above $\cos\theta$ and $\sin\theta$, V may be formed as follows:

$$V = \begin{pmatrix} \cos\theta & \sin\theta \\ \sin\theta e^{j\phi} & -\cos\theta e^{j\phi} \end{pmatrix}$$

and given the following:

$$U\Sigma = HV,$$

and also given the following:

$$u = h_1 \cos\theta + h_2 \sin\theta e^{j\phi},$$

which may be the first column of UΣ, the largest singular value may have the following form:

$$\sigma_1 = \|u\| = \sqrt{\sum_{i=1}^{N} |a_i|^2 \cos^2\theta + \sum_{i=1}^{N} |b_i|^2 \sin^2\theta + 2\left|\sum_{i=1}^{N} a_i b_i\right|^2 \cos\theta\sin\theta},$$

wherein $\|x\|$ represents the Euclidean norm and the second equality follows from the θ symbol above. As such, the corresponding singular vector is:

$$u_1 = \frac{u}{\sigma_1}.$$

Given the following equation, $$v = h_1 \sin\theta - h_2 \cos\theta e^{j\phi},$$

which may be the second column of UΣ, and given $\sigma_1^2 + \sigma_2^2 = \|H\|_F^2$, where $\|x\|_F$ represents the Frobenius norm, the smaller singular value may be obtained as follows:

$$\sigma_2 = \sqrt{\sum_{i=1}^{N} |a_i|^2 + \sum_{i=1}^{N} |b_i|^2 - \sigma_1^2}.$$

Thus, the corresponding singular vector may be:

$$u_2 = \frac{v}{\sigma_2}.$$

Table 1 depicts example Matlab pseudo-code for determining the singular vectors as described above.

TABLE 1

Sample Pseudo-Code

```
function [U, S, V] = SVDNx2(H)

t_1 = Σ_{i=1}^{N} |H(i, 1)|^2;  % 2N real multiplications t_2 = Σ_{i=1}^{N} |H(i, 2)|^2;  % 2N real multiplications t_3 = Σ_{i=1}^{N} H(i, 1) * conj(H(i, 2));  % 4N real multiplications t_4 = abs(t_2);  % 2 real multip. and 1 sqrt
e^{jφ} = t_3/t_4;  % 1 division
t_6 = (t_1 − t_2)/(2*t_4);  % 1 division
tan θ = √(1 + t_6^2) − t_5;  % 1 multi. 1 sqrt
cos θ = 1/√(1 + tan^2 θ);  % 1 multi. 1 sqrt. 1 division
sin θ = tan θ * cos θ;  % 1 multi.
t_5 = t_1 * cos^2 θ + t_2 * sin^2 θ + 2*t_4^2 * cos θ * sin θ;  % 7 multi
σ_1 = √t_6;  % 1 sqrt.
σ_2 = √(t_1 + t_2 − t_5);  % 1 sqrt.
```

TABLE 1-continued $$S = \begin{pmatrix} \sigma_1 & 0 \\ 0 & \sigma_2 \end{pmatrix};$$

$$V = \begin{pmatrix} \cos\theta & \sin\theta \\ \sin\theta e^{j\phi} & -\cos\theta e^{j\phi} \end{pmatrix};$$

t_7 = h_2 * e^{jφ}; % 4N real multi.
u_1 = (h_1 cos θ + t_7 sin θ)/σ_1; % 4N real multi. 1 division
u_2 = (h_1 sin θ − t_7 cos θ)/σ_1; % 4N real multi. 1 division
U = [u_1, u_2].

Once the singular vectors (e.g., $v_1$ and $v_2$, which may also be referred to as singular vectors $u_1$ and $u_2$) are determined by channel estimator 260, channel estimator 260 may provide the singular vectors to a precoder at the base station. For example, channel estimator 260 may provide the determined singular vectors $v_1$ and $v_2$ to processor 220, which forwards the determined singular vectors $v_1$ and $v_2$ to the base station in a management message via radio interface 240, one of the antennas 220A or 220B, and uplink 116C.

Rather than provide singular vectors for each of the subcarriers of a band (which may result in a considerable amount of the uplink 116C being used for overhead), closed loop MIMO may instead provide, as feedback, one set of singular vectors $v_1$ and $v_2$ per band, wherein a typical band is 400-800 KHz and spans 36-72 subcarriers. For example, that one set of singular vectors $V_1$ and $v_2$ per band may be determined for a central subcarrier of the band. However, this central subcarrier approach may not accurately represent the band. The subject matter described herein may relate to determining, at a client station, a phase-aligned, average singular vector for the band. For example, to determine the phase-aligned, average singular vector, the client station aligns the phase of each of the singular vectors of the subcarriers of the band, and then determines the average of the singular vector over the subcarriers of the band. The determined phase-aligned, average singular vector may be provided to the base station to configure a precoder for a MIMO transmission via downlinks 116A-B. In some implementations, the determined phase-aligned, average singular vector more accurately represents the band when compared to using the central subcarrier or using an average across the band that is not phase aligned.

For each of the MIMO transmissions sent via downlinks 116A-B and received at each of antennas 220A-B, the channel estimator 260 may determine channel estimation information. For example, for each of the subcarriers of a band, the channel estimator 260 may determine singular vectors using a singular value decomposition. In some embodiments, rather than perform a traditional, singular value decomposition to determine the singular vectors for each of the subcarriers, the channel estimator 260 may perform a closed form singular value decomposition to determine the singular vectors $V_1$ and $v_2$, as described above. For each of the subcarriers, channel estimator 260 may determine one or more of the singular vectors $v_1$ and $v_2$.

To determine the phase-aligned, average singular vector, channel estimator 260 may select one of the subcarriers and then use that subcarrier's singular vector $v_1$ to phase align the other subcarrier's singular vectors $v_1$. Once phase-aligned, the channel estimator 260 may determine the average of the singular vectors $v_1$ across all of the subcarriers of the band, and then normalize the average. In some embodiments, the channel estimator 260 may repeat the above process using the determined phase-aligned average singular vector $v_1$ (e.g., rather than selecting one of the subcarriers to align the phases of the other subcarriers, using the determined average and then aligning the phase of all of the other subcarriers relative to the determined average singular vector, and so forth). To determine the phase-aligned average singular vector for singular vector $v_2$, channel estimator 260 may repeat the above-described process using the singular vector $v_2$ of each of the subcarriers.

The following describes an exemplary implementation for determining average singular vectors including phase-aligned average singular vector for singular vectors $v_1$ and $v_2$.

Specifically, rather than using the central subcarrier of the band, the following four algorithms are described for designing a beamforming vector for a band which contains multiple subcarriers. The algorithms described below may be for one-stream schemes, but they may also be applied to two-stream schemes.

In the first algorithm, let B be the set of subcarrier indices of the band. The first algorithm may include the following:
1. Compute the matrix $$\sum_{i \in B} H_i H_i^*.$$

2. Obtain the principle eigen-vector $\upsilon$ of $$\sum_{i \in B} H_i H_i^*.$$

The vector $\upsilon$ may be the beamforming vector to be used for the whole band.

The second algorithm may include the following:
1. Compute the principle right singular vector $\upsilon_i$ of $H_i$ for $i \in B$.
2. Obtain the matrix $$\sum_{i \in B} v_i v_i^*.$$

3. Calculate the principle eigen-vector $\upsilon$ of $$\sum_{i \in B} v_i v_i^*,$$

which may be the beamforming vector to be used for the whole band.

The third algorithm (which may include phase alignment) may include the following:
1. Compute the principle right singular vector $\upsilon_i$ of $H_i$ for $i \in B$.
2. Pick up a vector $\upsilon_j$ for an arbitrary $j \in B$ and align the phase of other vectors by replacing $$v_j \leftarrow v_i \frac{v_i^* v_j}{|v_i^* v_j|}$$

so that $v_i^* v_j$ is a positive number.

3. Calculate the norm-1 vector $$\frac{\sum_{i \in B} v_i}{\left|\sum_{i \in B} v_i\right|},$$

which may be the beamforming vector to be used for the whole band.

The fourth algorithm (which may also include phase alignment) solves the following optimization problem. Generally, the underlying process is to solve the following minimization problem:

$$\min_{v,\phi} \sum \|v_i e^{j\phi_1} - v\|^2,$$
$$\text{s.t. } \|v\| = 1$$

wherein $\upsilon$ is the first or second singular vector of the channel in a subcarrier i. The fourth algorithm may work separately on each singular vector, each of which may not be limited in length. The optimal solution, given known phase $\phi$, may be as follows:

$$v = \sum_{i \in B} v_i e^{j\phi_1}.$$

Hence, a solution may be found using the alternate minimization (AM) method as follows: (1) pick any subcarrier j and align the phases of all singular vectors in the band relative to that subcarrier, i.e., $$v_j \leftarrow v_i \frac{v_i^* v_j}{|v_i^* v_j|};$$

(2) calculate the average beamforming vector by normalizing the vector; and (3) repeat step 1 by using the vector calculated in step 2. Performing more iterations may generally lead to better performance, but in some cases one or two iterations of steps (1)-(3) may provide sufficient accuracy.

Figure 3:
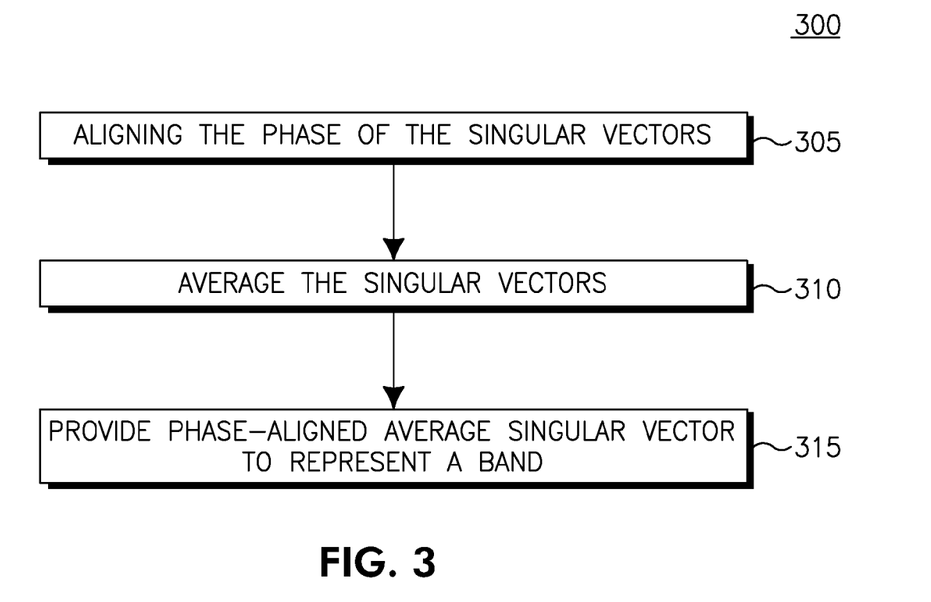
FIG. 3 depicts a process for determining a phase-aligned average singular vector for a band.

FIG. 3 depicts a process 300 for determining the phase-aligned average singular vector. The description of process 300 will also refer to FIG. 2. Channel estimator 260 at client station 114B may be configured to determine the singular vectors for each of the plurality of subcarriers of a band (e.g., using a singular value decomposition). At 305, channel estimator 260 may align the phase of the singular vectors. At 310, channel estimator 260 may average the aligned singular vectors across the band, thus yielding the phase-aligned average singular vector for the band. In some embodiments, the channel estimator 260 normalizes the singular vectors before determining the average. For example, the channel estimator 260 may normalize the singular vector $v_1$ of each of the subcarriers of the band, and then may determine the average of the phase-aligned vectors $v_1$ of the subcarriers of the band. At 315, the phase-aligned average singular vector may be provided (e.g., sent) to the base station, for example, to configure a precoder. In some implementations, process 300 is stored as program code and may be stored, for example, at memory 225.

Figure 4:
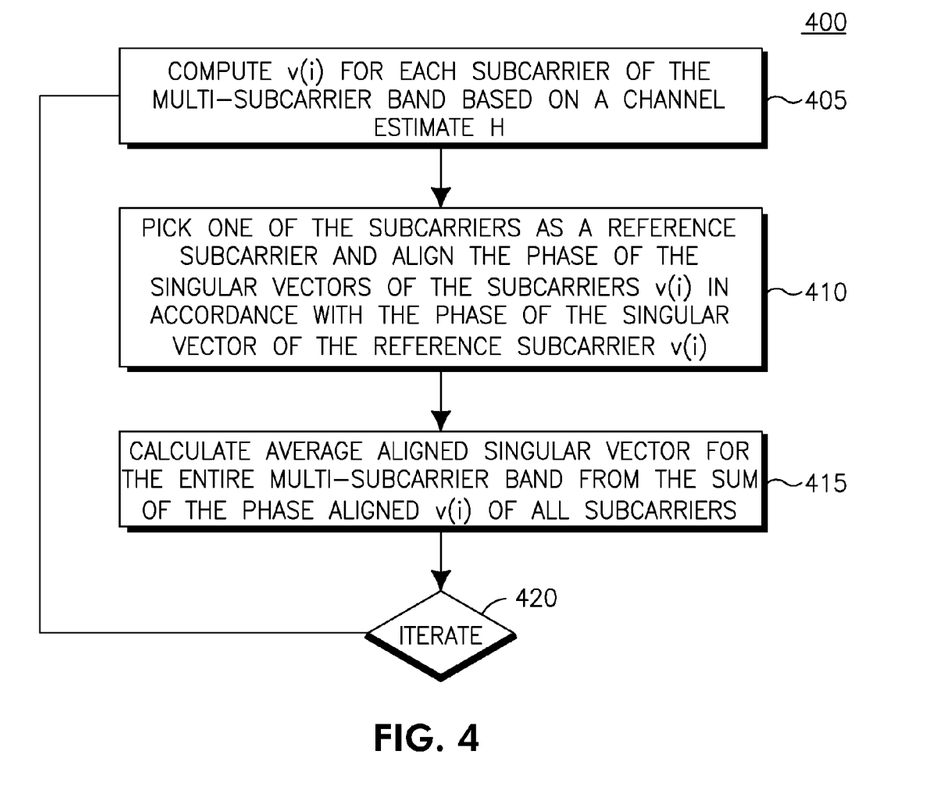
FIG. 4 depicts another process for determining a phase-aligned average singular vector.

FIG. 4 depicts a process 400 for determining an aligned average singular vector, which is aligned in accordance with the phase of a reference subcarrier. The description of process 400 will also refer to FIG. 2. At 405, channel estimator 260 may compute, based on the channel estimate, a v(i) (i.e., either a singular vector $v_1$ or a singular vector $v_2$) for each of the i subcarriers of a multi-subcarrier band. At 410, channel estimator 260 selects one of the subcarriers as a so-called "reference subcarrier." Channel estimator 260 may align the phase ($\phi_i$) of the singular vectors of the subcarriers in accordance with the phase ($\phi_j$) of the singular vector of the reference subcarrier. At 415, channel estimator 260 may calculate the average aligned singular vector for the entire multi-subcarrier band from the sum of phase-aligned singular vectors v(i) of all the subcarriers (e.g., all i subcarriers). At 420, channel estimator 260 may repeat 410 and 415 using the average aligned singular vector determined at 415 as the singular vector of the reference subcarrier. In some implementations, the phase alignment may be performed as described above with respect to algorithms 3 and 4. In some implementations, process 400 is stored as program code and may be stored, for example, at memory 225.

Figure 5:
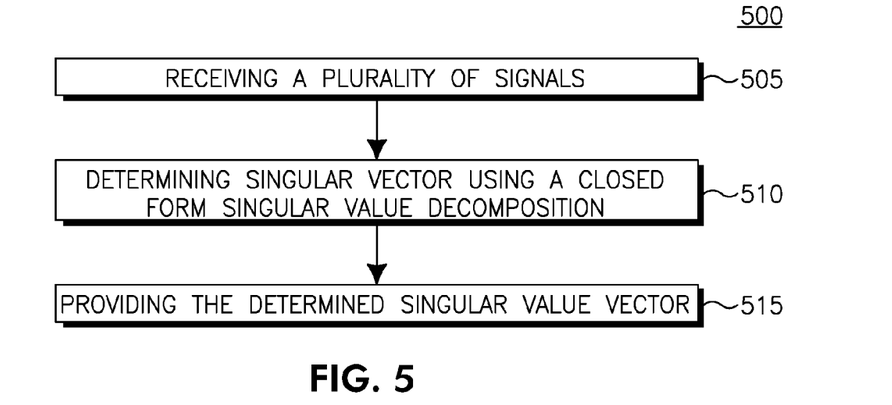
FIG. 5 depicts a process for determining the closed form singular value decomposition.

FIG. 5 depicts a process 500 for determining the closed form singular value decomposition. The description of process 500 will also refer to FIG. 2. At 505, a client station may receive a plurality of signals. For example, client station 114B may receive a plurality of RF signals transmitted by base station 110B as a multiple-input and multiple-output transmission. At 510, a singular vector may be determined using a closed form singular value decomposition. For example, channel estimator 260 may determine singular vectors $v_1$ and $v_2$ using the closed form singular value decomposition as described herein. At 515, the determined singular vector may be provided (e.g., sent) to the base station to configure a precoder. In some implementations, process 500 is stored as program code and may be stored, for example, at memory 225.

Figure 6:
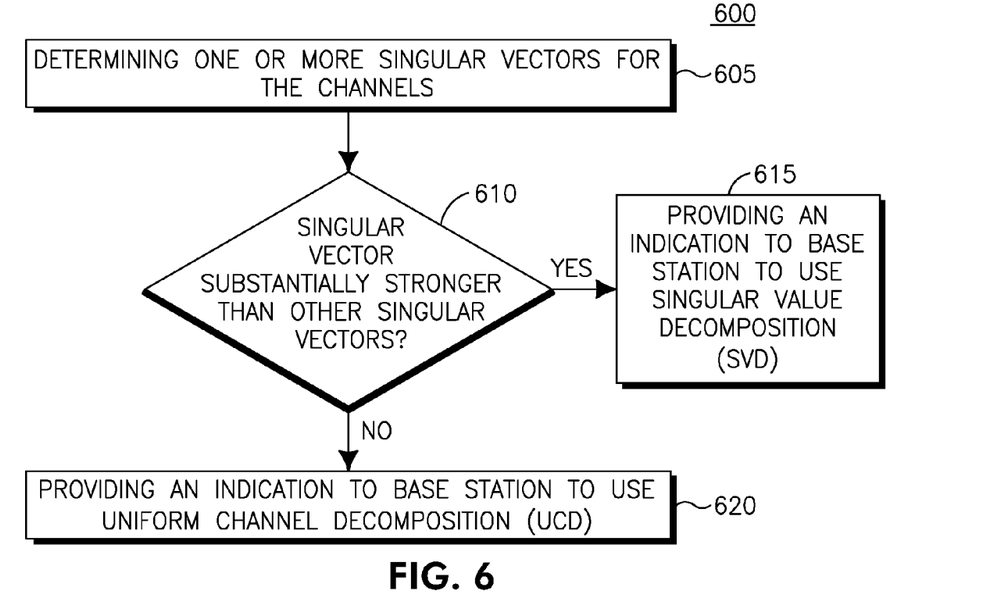
FIG. 6 depicts a process for determining whether to use a singular value decomposition or a uniform channel decomposition based on the strength of singular vectors.

FIG. 6 depicts a process 600 for determining, at a client station, whether to use a singular value decomposition or a uniform channel decomposition. The description of process 600 will also refer to FIG. 2. At 605, channel estimator 260 may determine one or more singular vectors for the channels (e.g., subcarriers). For example, if base station 110B transmits using MIMO over two antennas, channel estimator 260 may use a singular value decomposition to determine the singular vectors (e.g., singular vectors $v_1$ and $v_2$, also referred to as $u_1$ and $u_2$) for each of the channels.

At 610, channel estimator 260 determines whether one of the singular vectors is substantially larger (e.g., has a higher eigenvalue and is thus capable of more capacity) than the other singular vectors. For example, channel estimator 260 may normalize the determined singular vectors to have a range of zero to one. Given normalized vectors, a substantially larger singular vector $v_1$ may have a value close to or equal to one, while another singular vector may have a value close to zero. Continuing with this example, at 615, the channel estimator 260 may provide an indication to base station 110A to use a singular value decomposition at the precoder. If a singular value decomposition is used at the base station, the precoder at base station 110B provides, based on singular value decomposition, a single stream of symbols for MIMO transmission. On the other hand, when the singular vector $v_1$ is not substantially larger than the other singular vector (e.g., singular vector $v_1$ does not have a value close to or equal to one), at 620, the channel estimator 260 may provide an indication to the base station to use a uniform channel decomposition at the precoder. In some implementations, process 600 is stored as program code and may be stored, for example, at memory 225.

Figure 7:
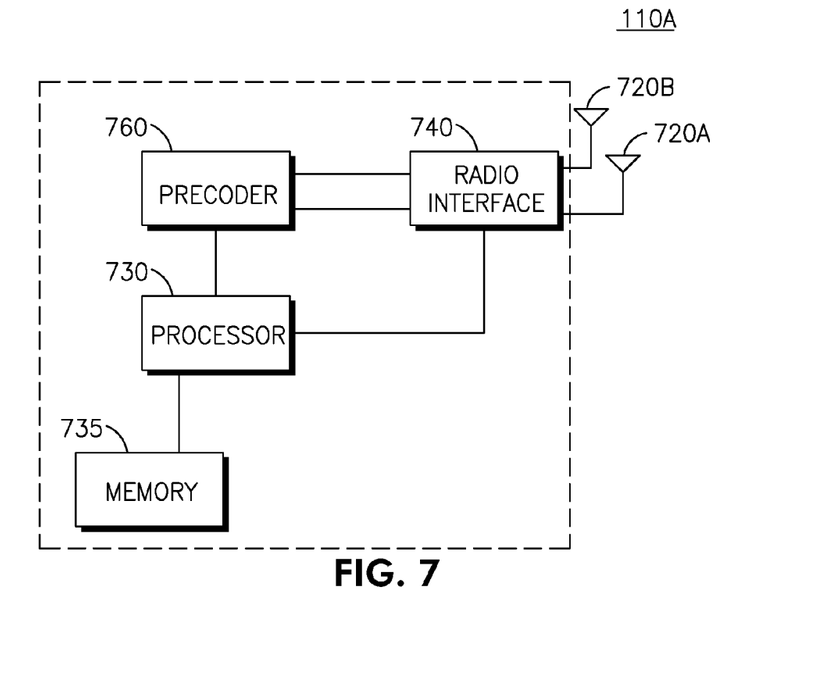
FIG. 7 depicts a block diagram of a base station.

FIG. 7 depicts a base station, such as base station 110A. The base station 110A includes antennas 720A-B configured to transmit via downlinks 116A-B and configured to receive uplink 116C via at least one of antennas 720A-B. The base station 110A may further include a radio interface 740 coupled to the antennas 720A-B, a precoder 760 (described further below), a processor 730 for controlling base station 110A and for accessing and executing program code stored in memory 735. The radio interface 740 may further include other components, such as filters, converters (e.g., digital-to-analog converters and the like), mappers, a Fast Fourier Transform (FFT) module, and the like, to generate symbols for a MIMO transmission via downlinks 116A-B and to receive the channel estimation information provided via uplink 116C; to receive the phase-aligned average singular vectors $v_1$ and $v_2$ for the band of subcarriers via uplink 116C; and/or to receive from a client station an indication of whether to use a singular value decomposition or a uniform channel decomposition at the base station when transmitting using MIMO to the client station. The indication may serve as a form of rank adaptation In some implementations, the base station 110A may also be compatible with IEEE 802.16 and the RF signals of the MIMO downlinks 116A-B and uplink 116C are configured in accordance with OFDMA. The precoder 760 may use the determined values of phase-aligned average singular vectors $v_1$ and $v_2$ as well as any other channel estimate information (including so-called "side information") about the subcarriers to precode each of the streams to be transmitted as a MIMO transmission by antennas 720A-B.

The radio interface 740 may decode the uplink 116C carrying the singular vectors $v_1$ and $v_2$ and then provides the singular vectors $v_1$ and $v_2$ to the precoder 760. Alternatively or additionally, the radio interface 740 may decode the uplink 116C carrying the phase-aligned average singular vectors $v_1$ and $v_2$ and then provides the phase-aligned average singular vectors $v_1$ and $v_2$ to the precoder 760. The precoder 760 may use the singular vectors $v_1$ and $v_2$ and/or the phase-aligned average singular vectors $v_1$ and $v_2$ (as well as any other channel estimation information and/or side information provided as feedback by the client station to the base station) to precode symbols for MIMO transmission via each antenna 720A-B and downlinks 116A-B. The term "precoding" refers to beamforming to support MIMO transmission at each of the antennas (e.g., using singular vectors to weight orthogonal "eigen-beams" transmitted via each of the antennas).

Alternatively or additionally, the radio interface 740 may decode the uplink 116C carrying an indication (e.g., a management message received from a client station) representative of whether the precoder is configured to perform a singular value decomposition or a uniform channel decomposition. The radio interface 740 may also decode uplink 116C carrying any channel estimation information (e.g., singular vectors determined at the client station), which are provided to the precoder 760. The precoder 760 receives the indication and may configure for a singular value decomposition or a uniform channel decomposition. When a singular value decomposition is used, the precoder at the base station may provide a single stream for MIMO transmission via the antennas 720A-B. When uniform channel decomposition is used, the precoder 760 uses any singular vectors $v_1$ and $v_2$ determined at the client station (as well as any other channel estimation information provided as feedback by the client station to the base station) to provide, based on a uniform channel decomposition, a plurality of symbols streams (e.g., two symbol streams) for MIMO transmission via each antenna 720A-B.

Figure 8:
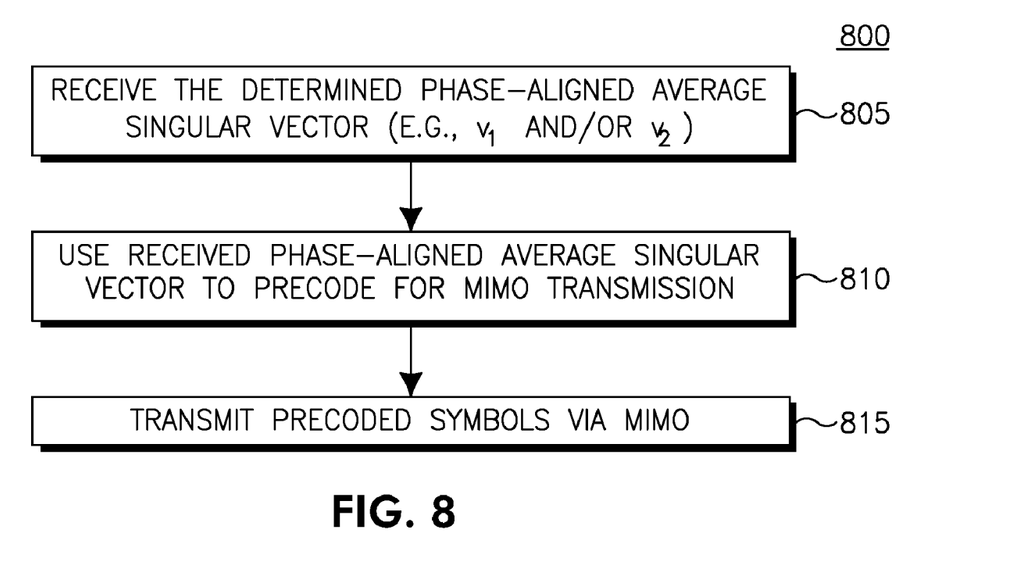
FIG. 8 depicts a process for using the phase-aligned average singular vector at a base station.

FIG. 8 depicts a process 800, at the base station, for using the phase-aligned average singular vectors determined at the client station. The description of process 800 will refer to FIGS. 2 and 7 as well. At 805, a base station, such as base station 110A, receives the phase-aligned average singular vector (e.g., for $v_1$ and/or $v_2$) determined at a client station, such as client station 114B. At 810, the received phase-aligned average singular vector may be used at a precoder, such as precoder 760, when precoding signals for transmission using multiple-input and multiple-output transmission. At 815, the base station may transmit, as the multiple-input and multiple-output transmission, the precoded plurality of signals (e.g., symbols carried via downlink 116A-B). In some implementations, process 800 is stored as program code and may be stored, for example, at memory 735.

Figure 9:
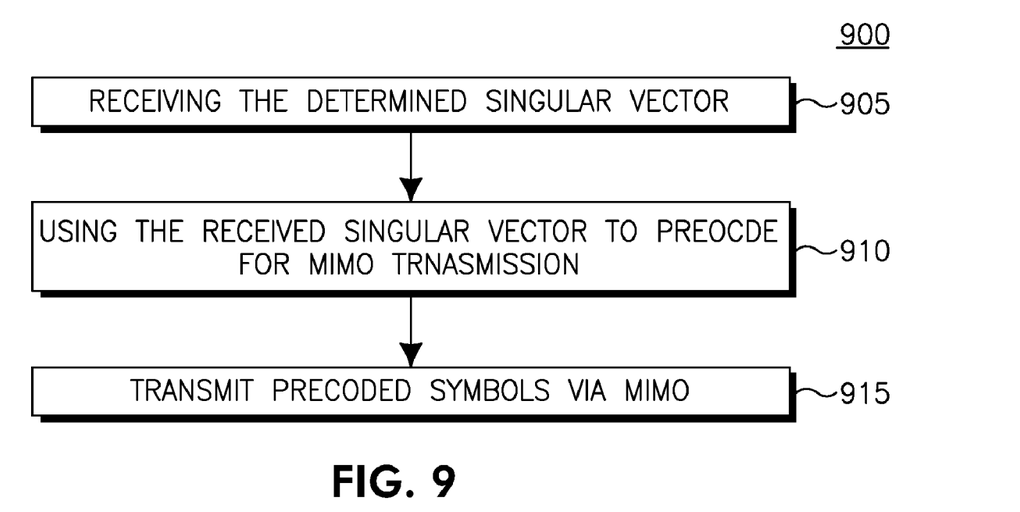
FIG. 9 depicts a process, at a base station, for using the singular vectors determined using closed form singular value decomposition.

FIG. 9 depicts a process 900, at the base station, for using the singular vectors determined using the closed form singular value decomposition. The description of process 900 will refer to FIGS. 2 and 7 as well. At 905, a base station, such as base station 110A, receives one or more singular vectors determined at a client station, such as client station 114B, using the closed form singular value decomposition described herein. At 910, the received singular vectors may be used at a precoder, such as precoder 760, when precoding signals for transmission using multiple-input and multiple-output transmission. At 915, the base station may transmit, as the multiple-input and multiple-output transmission, the precoded plurality of signals (e.g., symbols carried via downlink 116A-B). In some implementations, process 900 is stored as program code and may be stored, for example, at memory 735.

Moreover, in some implementations, the client station may feed back the largest singular vector of the collaborating base station antennas. This is referred to as joint antenna processing multi-basestation MIMO in 802.16m or coordinated multi-point transmission (COMP) in LTE. For example, if each base station has 4 antennas and 3 base stations are collaborating, the singular vector has L=12 complex numbers. The computation of the singular vector(s) for a client station with 2 antennas may be performed as noted above. For example, the largest singular vector for any subcarrier may be given by $v=h_1^* \cos \theta + h_2^* \sin \theta e^{j\phi}$, where $h_i$, i=1, 2 is the ith row of H, and the 2×L global downlink channel between the client station and all of the collaborating base stations is as follows:

$$e^{j\phi} = \frac{h_2^* h_1}{|h_2^* h_1|}$$

and $$\tan 2\theta = \frac{2|h_2^* h_1|}{|h_1|^2 - |h_2|^2}.$$

The phase-aligned singular vectors of several subcarriers may be averaged within a band to get the average singular vector. The resulting singular vector is $$v = \sum_{k \in S} v_k \frac{v_k^* v_j}{|v_k^* v_j|},$$

where j denotes one of the subcarriers.

Figure 10:
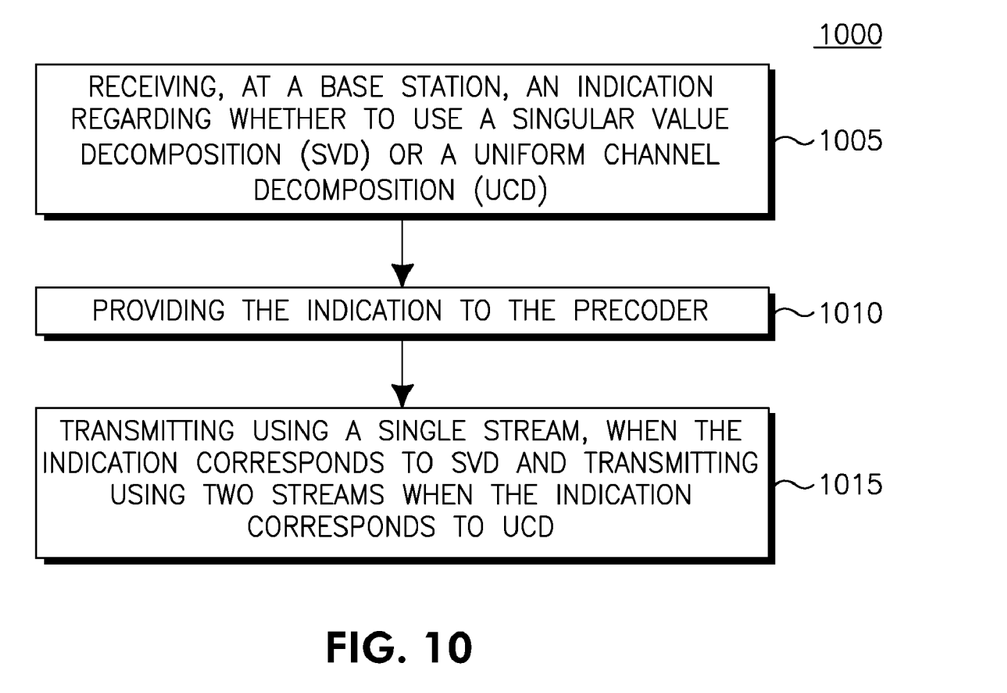
FIG. 10 depicts a process for configuring a base station to use a singular value decomposition or a uniform channel decomposition.

FIG. 10 depicts a process 1000 for configuring a base station to use a singular value decomposition adaptation or a uniform channel decomposition based on the strength singular vectors determined by a client station. The description of process 1000 will refer to FIGS. 2 and 7 as well. At 1005, a base station, such as base station 110A, receives an indication from a client station representative of whether to use a singular value decomposition or a uniform channel decomposition, when transmitting to the client station. For example, client station 114B may provide the indication as a management message via uplink 116C. At 1010, the received indication may be provided to a precoder, such as precoder 760. If the indication corresponds to a singular value decomposition, the precoder 760 provides, based on a singular value decomposition, a single stream of symbols for MIMO transmission via antennas 720A-B. When the indication corresponds to uniform channel decomposition, the precoder 760 may use any singular vectors $v_1$ and $v_2$ determined at the client station (as well as any other channel estimation information provided as feedback by the client station to the base station) to provide, based on a uniform channel decomposition, a plurality of symbols streams (e.g., two symbol streams) for MIMO transmission via antennas 720A-B. At 1015, the base station may transmit to the client station based on the indication provided by the client station. For example, the base station 110A may configure transmission to the client station 114B based on whether the client station 114B has indicated that the base station 110A should transmit in accordance with a singular value decomposition or a uniform channel decomposition. In the case of a uniform channel decomposition, the client station 114B may also provide channel estimation information, such as singular vectors, a channel covariance matrix, and the like. In some implementations, process 1000 is stored as program code and may be stored, for example, at memory 735.

Moreover, typically, rank-2 operation decomposes the channel using singular value decomposition and transmits on the two eigen-subchannels. This orthogonalization of the channel may cause reduced performance in some implementations, which do not use matched modulation and coding schemes to each singular vector. To address that issue, the eigen-subchannels may be rotated mathematically such that the two subchannels become two layers with identical output SINR when decoded using a successive interference cancellation (SIC) receiver. This is the underlying essence of uniform channel decomposition.

To further illustrate, rank adaptation may be performed using uniform channel decomposition in a practical closed loop MIMO operation. The client station (e.g., mobile station) or base station may decide on the best rank for the transmission according to the channel, SINR, and other considerations using, for example, a capacity criterion. In the case of rank-1 transmission, the strongest singular vector may be used. In the case of rank-2 transmission, the precoder is calculated based on the uniform channel decomposition. In order to calculate the uniform channel decomposition, information regarding the channel's right singular vectors and singular values are required. This is best facilitated in frequency division duplex by the client station feeding back analog feedback of the channel or channel covariance matrix. Alternatively or additionally, the two singular vectors and the ratio of the singular values may also be sent as feedback. Moreover, the feedback may be facilitated by using codebooks and feeding back for rank-2 one extra value representing the ratio of the singular values.

Figure 11:
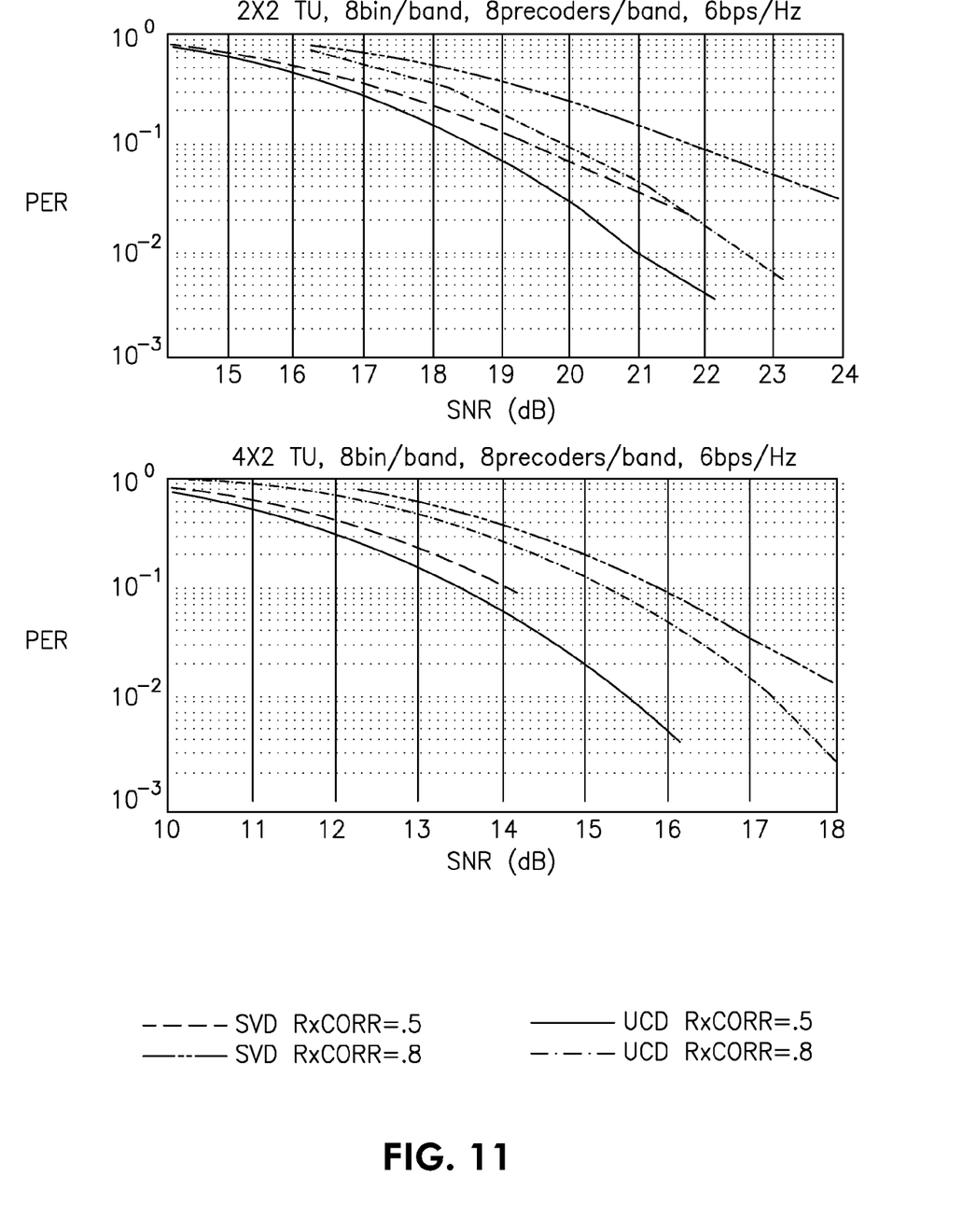
FIG. 11 depicts simulation results.

FIG. 11 depicts plots of simulation results showing a comparison of rank-2 transmission between the uniform channel decomposition method and a regular singular value decomposition in 2×2 and 2×4 configurations using a GSM TU channel, wherein one precoder per 9 subcarriers (bin) is used and 6 bits per second per hertz is the combined two stream spectral efficiency. FIG. 11 depicts the gain of uniform channel decomposition approach.

The subject matter described herein may be embodied in systems, apparatus, methods, and/or articles depending on the desired configuration. Base station 110A (or one or more components therein) can be implemented using one or more of the following: a processor executing program code, an application-specific integrated circuit (ASIC), a digital signal processor (DSP), an embedded processor, a field programmable gate array (FPGA), and/or combinations thereof. Client station 114B (or one or more components therein) can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the above closed form singular value decomposition may be used in other applications, such as at the base station to determine singular vectors for a sounder transmitted by the client station to the base station. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A method comprising:
   determining, at a client station, a plurality of singular vectors for channels used in a multiple-input multiple-output (MIMO) transmission from a base station to the client station;
   providing, by the client station, a first indication to the base station to use a singular value decomposition, when a first one of the plurality of singular vectors is substantially larger than a second one of the plurality of singular vectors; and
   providing, by the client station, a second indication to the base station to use a uniform channel decomposition, when the first one of the plurality of singular vectors is not substantially larger than the second one of the plurality of singular vectors.

2. The method of claim 1, further comprising:
   receiving a single stream of symbols, when the first one of the plurality of singular vectors is substantially larger than the second one of the plurality of singular vectors.

3. The method of claim 1, further comprising:
   receiving a plurality of streams of symbols, when the first one of the plurality of singular vectors is not substantially larger than the second one of the plurality of singular vectors.

4. A method comprising:
   receiving, at a base station from a client station, a first indication to use a singular value decomposition, when a first one of a plurality of singular vectors is substantially larger than a second one of the plurality of singular vectors;
   receiving, at the base station from the client station, a second indication to use a uniform channel decomposition, when the first one of the plurality of singular vectors is not substantially larger than the second one of the plurality of singular vectors; and
   configuring the base station for transmission based on at least one of the first indication or the second indication received from the client station.

5. A client station comprising:
   a channel estimator and a processor configured to:
      determine a plurality of singular vectors for channels used in a multiple-input multiple-output (MIMO) transmission from a base station to the client station;
      provide, via a radio interface, a first indication to the base station to use a singular value decomposition, when a first one of the plurality of singular vectors is substantially larger than a second one of the plurality of singular vectors; and
      provide, via the radio interface, a second indication to the base station to use a uniform channel decomposition, when the first one of the plurality of singular vectors is not substantially larger than the second one of the plurality of singular vectors.

6. The client station of claim 5, further comprising:
   the radio interface configured to receive a single stream of symbols, when the first one of the plurality of singular vectors is substantially larger than the second one of the plurality of singular vectors.

7. The client station of claim 5, further comprising:
   the radio interface configured to receive a plurality of streams of symbols, when the first one of the plurality of singular vectors is not substantially larger than the second one of the plurality of singular vectors.

8. A base station comprising:
a precoder and a processor configured to:
  receive from a client station, via a radio interface, a first indication to use a singular value decomposition, when a first one of a plurality of singular vectors is substantially larger than a second one of the plurality of singular vectors;
  receive from the client station, via the radio interface, a second indication to use a uniform channel decomposition, when the first one of the plurality of singular vectors is not substantially larger than the second one of the plurality of singular vectors; and
  configure the base station for transmission based on at least one of the first indication or the second indication received from the client station.

* * * * *